(12) United States Patent
Cho et al.

(10) Patent No.: US 12,263,742 B2
(45) Date of Patent: Apr. 1, 2025

(54) WIRELESS CHARGING SYSTEM

(71) Applicant: GREEN POWER CO., LTD., Hwaseong-si (KR)

(72) Inventors: Jung Goo Cho, Suwon-si (KR); Seunghun Han, Daejeon (KR)

(73) Assignee: GREEN POWER CO., LTD., Hwaseong-si (KR)

( * ) Notice: Subject to any disclaimer, the term of this patent is extended or adjusted under 35 U.S.C. 154(b) by 592 days.

(21) Appl. No.: 17/402,935

(22) Filed: Aug. 16, 2021

(65) Prior Publication Data

US 2022/0242256 A1 Aug. 4, 2022

(30) Foreign Application Priority Data

Aug. 18, 2020 (KR) ........................ 10-2020-0103459

(51) Int. Cl.
*B60L 53/12* (2019.01)
*B60L 53/31* (2019.01)
(Continued)

(52) U.S. Cl.
CPC .............. *B60L 53/12* (2019.02); *B60L 53/31* (2019.02); *B60L 53/36* (2019.02); *B60L 53/38* (2019.02);
(Continued)

(58) Field of Classification Search
CPC .. H02J 17/00; H02J 5/005; H02J 7/025; H02J 50/00; H02J 50/10; H02J 50/05; H02J 50/12; H02J 50/15; H02J 50/20; H02J 50/23; H02J 50/27; H02J 50/30; H02J 50/40; H02J 50/50; H02J 50/60;
(Continued)

(56) References Cited

U.S. PATENT DOCUMENTS 8,072,182 B2 * 12/2011 Vasilantone .......... B60L 53/126
320/109
8,450,968 B2 * 5/2013 Navarro Ruiz .......... B62M 6/80
320/109
(Continued)

FOREIGN PATENT DOCUMENTS

EP 3413433 A1 * 12/2018 .............. B60L 11/18
JP H09102329 A 4/1997
(Continued)

OTHER PUBLICATIONS

JP2003118671_Machine_Translation_Document.pdf (Year: 2003).*
(Continued)

*Primary Examiner* — John T Trischler
(74) *Attorney, Agent, or Firm* — Studebaker Brackett PLLC

(57) ABSTRACT

The present invention relates to a wireless charging system for a personal mobility capable of guaranteeing charging efficiency for the personal mobility by implementing a docking structure allowing a feeding pad of a wireless charging dock and a current collecting pad of the personal mobility to be constantly aligned with each other and keeping a gap between the feeding pad and the current collecting pad always constant at the time of docking the personal mobility on the wireless charging dock regardless of a design of the personal mobility docked on the wireless charging dock for charging.

19 Claims, 8 Drawing Sheets

(51) Int. Cl.
*B60L 53/36* (2019.01)
*B60L 53/38* (2019.01)
*B60L 53/66* (2019.01)
*H02J 50/00* (2016.01)
*H02J 50/10* (2016.01)
*H02J 50/12* (2016.01)
*H02J 50/40* (2016.01)
*H02J 7/00* (2006.01)

(52) U.S. Cl.
CPC ............ *B60L 53/66* (2019.02); *H02J 50/005* (2020.01); *H02J 50/10* (2016.02); *H02J 50/12* (2016.02); *H02J 50/402* (2020.01); *B60L 2200/12* (2013.01); *B60L 2200/24* (2013.01); *B60Y 2200/91* (2013.01); *H02J 7/0048* (2020.01)

(58) Field of Classification Search
CPC .. H02J 50/70; H02J 50/80; H02J 50/90; H02J 50/402; H02J 50/005; H04B 5/0037; H04B 5/00; H04B 5/0075; H04B 5/0081; H04B 5/0025; H04B 5/0093; H04B 5/0087; B60L 2200/24; B60L 11/182; B60L 11/1829; B60L 11/1831; B60L 2230/14; B60L 53/38; B60L 53/39; B60L 53/12; B60L 53/31; B60L 53/36; B60L 53/66; H01F 38/14; Y02T 90/122
USPC .......................................... 320/108; 307/104
See application file for complete search history.

(56) References Cited

U.S. PATENT DOCUMENTS

| | | | | |
|---|---|---|---|---|
| 8,485,369 B2* | 7/2013 | Glover | ................... | B60P 3/073 |
| | | | | 211/24 |
| 8,807,308 B2* | 8/2014 | Suh | ................... | B60L 50/51 |
| | | | | 191/4 |
| 8,833,533 B2* | 9/2014 | Suh | ................... | B60L 53/14 |
| | | | | 191/10 |
| 8,937,454 B2* | 1/2015 | Baarman | ................ | B60L 53/305 |
| | | | | 320/108 |
| 9,068,374 B2* | 6/2015 | Jayadevappa | ............ | B62H 3/00 |
| 9,180,922 B2* | 11/2015 | Glover | ................... | B62H 3/04 |
| 9,199,681 B2* | 12/2015 | Gonzalez Hernandez | ................ | |
| | | | | B62H 5/005 |
| 9,227,680 B2* | 1/2016 | Kritzer | ................... | E05B 71/00 |
| 9,333,870 B2* | 5/2016 | Kume | ................. | B60L 53/124 |
| 9,586,639 B2* | 3/2017 | Kritzer | ................... | B60B 7/00 |
| 9,627,929 B2* | 4/2017 | Kanno | ................... | H02J 50/12 |
| 9,701,212 B2* | 7/2017 | Baarman | ............. | G01R 29/0814 |
| 9,809,125 B2* | 11/2017 | Kim | ................... | B60L 53/38 |
| 9,889,755 B2* | 2/2018 | Frament | ................. | B60L 53/12 |
| 10,112,667 B2* | 10/2018 | Fournier | ................ | B62H 3/00 |
| 10,186,909 B2* | 1/2019 | Kanno | .................. | H02J 50/90 |
| 10,249,128 B1* | 4/2019 | Yang | .................. | G07F 9/001 |
| 10,286,799 B2* | 5/2019 | Namou | ................... | B60L 53/30 |
| 10,500,976 B2* | 12/2019 | Jang | ................... | B60L 53/31 |
| 10,543,752 B2* | 1/2020 | Moravick | ............... | B60L 58/12 |
| 10,641,014 B2* | 5/2020 | Tepper | ................... | B62H 5/20 |
| 10,668,967 B2* | 6/2020 | Byun | .................. | B60L 53/12 |
| 10,800,378 B1* | 10/2020 | Drayna | .................. | B60L 53/68 |
| 10,843,752 B2* | 11/2020 | Sawhill | ................... | B62H 3/10 |
| 10,858,015 B2* | 12/2020 | Lery | ...................... | B61D 3/18 |
| 10,903,721 B2* | 1/2021 | Ko | ................... | H02K 11/0094 |
| 10,919,405 B2* | 2/2021 | Moravick | ............. | B60L 3/0046 |
| 10,946,753 B2* | 3/2021 | Cho | ..................... | B60L 53/14 |
| 10,946,758 B2* | 3/2021 | Moravick | ............. | H02J 7/0044 |
| 11,094,971 B2* | 8/2021 | Wang | .................. | H01M 10/48 |
| 11,214,322 B2* | 1/2022 | Askin | .................. | B60R 25/305 |
| 11,225,297 B2* | 1/2022 | Sawhill | ................... | B62H 5/142 |
| 11,299,055 B2* | 4/2022 | Miyoshi | ................... | H02J 50/90 |
| 11,353,330 B2* | 6/2022 | Kim | ................... | G01C 21/3469 |
| 11,377,015 B2* | 7/2022 | Outoukian | ................ | B60P 3/07 |
| 11,377,167 B2* | 7/2022 | Le Rodallec | ........... | B60L 53/14 |
| 11,447,200 B2* | 9/2022 | Errickson, Jr. | ......... | B62H 5/145 |
| 11,485,240 B2* | 11/2022 | Hwang | ................... | B60L 53/80 |
| 11,498,633 B2* | 11/2022 | Hatch | ................... | B62H 3/08 |
| 11,619,947 B2* | 4/2023 | Rastoll | ..................... | H02J 50/10 |
| | | | | 701/23 |
| 11,712,975 B2* | 8/2023 | Saint-Germain | ...... | H02J 7/0042 |
| | | | | 320/108 |
| 11,752,890 B2* | 9/2023 | Harpin | ..................... | B62J 45/00 |
| | | | | 320/109 |
| 11,820,326 B2* | 11/2023 | Drayna | ................... | H04W 4/80 |
| 11,878,755 B2* | 1/2024 | Demers | ................... | B62H 3/08 |
| 11,951,848 B2* | 4/2024 | Curran | ................... | B60L 53/38 |
| 11,951,853 B2* | 4/2024 | Montague | ............... | B60L 53/66 |
| 11,981,218 B2* | 5/2024 | Kalligeros | ............... | G07C 9/28 |
| 11,993,160 B2* | 5/2024 | An | ............................ | H02J 50/10 |
| 12,046,919 B2* | 7/2024 | Arai | ...................... | H02J 50/005 |
| 12,141,717 B2* | 11/2024 | Bromwich | ............... | H04W 4/40 |
| 2009/0189564 A1* | 7/2009 | Vasilantone | ........... | H02J 50/10 |
| | | | | 320/108 |
| 2009/0250564 A1* | 10/2009 | Glover | ..................... | B62H 3/04 |
| | | | | 410/98 |
| 2010/0089846 A1* | 4/2010 | Navarro Ruiz | ........ | H02J 7/0042 |
| | | | | 320/109 |
| 2010/0228405 A1* | 9/2010 | Morgal | .................... | B62H 3/00 |
| | | | | 701/1 |
| 2011/0037240 A1* | 2/2011 | Kritzer | ..................... | E05B 51/02 |
| | | | | 211/20 |
| 2011/0095623 A1* | 4/2011 | Doh | ............................ | B62M 6/90 |
| | | | | 307/119 |
| 2011/0148346 A1* | 6/2011 | Gagosz | .................. | B60L 50/20 |
| | | | | 320/135 |
| 2011/0181240 A1* | 7/2011 | Baarman | ............ | G01R 29/0814 |
| | | | | 320/108 |
| 2012/0103741 A1* | 5/2012 | Suh | .......................... | B60L 53/14 |
| | | | | 191/10 |
| 2012/0143401 A1* | 6/2012 | Jayadevappa | ........ | E05B 47/0012 |
| | | | | 701/2 |
| 2012/0186927 A1* | 7/2012 | Suh | .......................... | B60L 50/51 |
| | | | | 191/10 |
| 2013/0193091 A1* | 8/2013 | Kritzer | ..................... | B62H 5/00 |
| | | | | 211/5 |
| 2013/0270202 A1* | 10/2013 | Glover | .................... | B60P 3/073 |
| | | | | 211/24 |
| 2014/0125142 A1* | 5/2014 | Kanno | .................... | H02J 50/12 |
| | | | | 307/104 |
| 2015/0035482 A1* | 2/2015 | Kume | .................... | B60L 53/38 |
| | | | | 320/108 |
| 2015/0069967 A1* | 3/2015 | Baarman | ................ | B60L 53/122 |
| | | | | 320/108 |
| 2015/0102714 A1* | 4/2015 | Gonzalez Hernandez | .................. | |
| | | | | A47B 81/00 |
| | | | | 211/20 |
| 2015/0314820 A1* | 11/2015 | Fournier | ............. | E05B 73/0011 |
| | | | | 70/62 |
| 2015/0330109 A1* | 11/2015 | Tepper | ................... | G05B 15/02 |
| | | | | 700/237 |
| 2016/0159233 A1* | 6/2016 | Kim | ...................... | B60L 53/126 |
| | | | | 320/108 |
| 2016/0167725 A1* | 6/2016 | Kritzer | ...................... | B60B 7/00 |
| | | | | 211/5 |
| 2016/0197492 A1* | 7/2016 | Fujita | ...................... | B60L 53/12 |
| | | | | 307/104 |
| 2016/0229301 A1* | 8/2016 | Frament | ................. | B60L 53/38 |
| 2016/0311334 A1* | 10/2016 | Moravick | ............... | B60L 58/12 |
| 2017/0179770 A1* | 6/2017 | Kanno | .................... | H02J 50/12 |
| 2018/0022410 A1* | 1/2018 | Kritzer | ..................... | B62H 3/04 |
| | | | | 211/5 |
| 2018/0056799 A1* | 3/2018 | Namou | ................... | B60L 58/20 |
| 2018/0141603 A1* | 5/2018 | Byun | .................... | B62H 5/003 |
| 2018/0370386 A1* | 12/2018 | Lery | ..................... | B60M 7/003 |
| 2019/0039465 A1* | 2/2019 | Jang | .................... | B60L 53/665 |
| 2019/0135158 A1* | 5/2019 | Outoukian | ............. | B60L 53/14 |
| 2019/0168631 A1* | 6/2019 | Cho | ........................ | B60L 53/14 |
| 2019/0248439 A1* | 8/2019 | Wang | ..................... | B62K 11/10 |
| 2019/0263281 A1* | 8/2019 | Wang | ..................... | B60L 53/60 |

(56) References Cited

U.S. PATENT DOCUMENTS

| | | | |
|---|---|---|---|
| 2019/0280344 A1* | 9/2019 | Wang | H04B 5/79 |
| 2019/0344850 A1* | 11/2019 | Sawhill | B62H 3/04 |
| 2020/0031247 A1* | 1/2020 | Moravick | B60L 50/20 |
| 2020/0136466 A1* | 4/2020 | Ko | H02K 7/1846 |
| 2020/0223507 A1* | 7/2020 | Le Rodallec | B60L 53/16 |
| 2020/0231053 A1* | 7/2020 | Saint-Germain | B60L 50/20 |
| 2020/0255077 A1* | 8/2020 | Byun | B60L 53/31 |
| 2020/0271471 A1* | 8/2020 | Kim | G01C 21/3697 |
| 2020/0307403 A1* | 10/2020 | Rastoll | B60L 53/66 |
| 2020/0331551 A1* | 10/2020 | Errickson, Jr. | B62H 5/145 |
| 2020/0338993 A1* | 10/2020 | Hwang | B60L 58/12 |
| 2020/0361328 A1* | 11/2020 | Moravick | H02J 7/0044 |
| 2020/0406772 A1* | 12/2020 | Harpin | B60L 53/31 |
| 2021/0001741 A1* | 1/2021 | Miyoshi | G06K 7/10881 |
| 2021/0027214 A1* | 1/2021 | Bromwich | H04W 4/40 |
| 2021/0094640 A1* | 4/2021 | Sawhill | B62H 3/10 |
| 2021/0135496 A1* | 5/2021 | Kato | H02J 50/40 |
| 2021/0138921 A1* | 5/2021 | Fox | H02J 7/0048 |
| 2021/0170893 A1* | 6/2021 | Moravick | B60L 53/31 |
| 2021/0171143 A1* | 6/2021 | Hatch | B62H 3/08 |
| 2021/0261091 A1* | 8/2021 | Drayna | B60L 53/68 |
| 2021/0316633 A1* | 10/2021 | Kalligeros | B60L 53/80 |
| 2021/0323424 A1* | 10/2021 | Montague | B60L 53/30 |
| 2021/0354772 A1* | 11/2021 | Askin | B62J 6/03 |
| 2021/0394625 A1* | 12/2021 | Curran | B60L 53/38 |
| 2022/0080847 A1* | 3/2022 | Allison | B60L 53/16 |
| 2022/0126707 A1* | 4/2022 | An | B60L 58/12 |
| 2022/0185134 A1* | 6/2022 | Miyoshi | H02J 50/10 |
| 2022/0194503 A1* | 6/2022 | Askin | B62J 6/03 |
| 2022/0258624 A1* | 8/2022 | Deppe | B60L 53/14 |
| 2022/0371468 A1* | 11/2022 | Eliseev | B60L 53/66 |
| 2022/0376557 A1* | 11/2022 | Arai | B62B 5/00 |
| 2023/0029793 A1* | 2/2023 | Suda | B60L 53/16 |
| 2023/0050076 A1* | 2/2023 | Hamamoto | H02J 7/00036 |
| 2023/0110828 A1* | 4/2023 | Entwistle | H02K 11/215 324/207.2 |
| 2023/0127130 A1* | 4/2023 | Matsushita | B60L 53/31 320/109 |
| 2023/0147563 A1* | 5/2023 | Matsushita | H02J 7/00 307/104 |
| 2023/0150390 A1* | 5/2023 | Moussavi | B60L 53/66 320/109 |
| 2023/0182606 A1* | 6/2023 | Matsushita | B60L 53/126 320/109 |
| 2023/0182610 A1* | 6/2023 | Matsushita | B60L 53/65 700/297 |
| 2023/0202326 A1* | 6/2023 | Brooks | B60L 53/65 320/109 |
| 2023/0204375 A1* | 6/2023 | Nakamura | B60L 53/52 701/425 |
| 2023/0211690 A1* | 7/2023 | Heo | B60L 53/62 320/109 |
| 2023/0278443 A1* | 9/2023 | Deppe | B60L 53/14 320/109 |
| 2023/0322102 A1* | 10/2023 | Saint-Germain | H02J 7/0013 320/108 |
| 2023/0322316 A1* | 10/2023 | Demers | B62H 3/08 211/20 |
| 2023/0339339 A1* | 10/2023 | Kim | H01F 38/14 |
| 2023/0365005 A1* | 11/2023 | Kim | B60L 53/67 |
| 2023/0373331 A1* | 11/2023 | Harpin | B62H 3/00 |
| 2023/0382244 A1* | 11/2023 | Park | B62J 45/00 |

FOREIGN PATENT DOCUMENTS

| | | | | |
|---|---|---|---|---|
| JP | 2003118671 A | * | 4/2003 | B60L 50/20 |
| JP | 2006183455 A | * | 7/2006 | |
| JP | 2011045190 A | * | 3/2011 | |
| KR | 101955216 B1 | * | 3/2019 | |
| KR | 102120718 B1 | * | 6/2020 | |
| WO | 2017150709 A1 | | 9/2017 | |
| WO | 2020123337 A1 | | 6/2020 | |

OTHER PUBLICATIONS

EP3413433A1_Machine Translation (Year: 2018).*
KR102120718_Machine_Translation_Description (Year: 2020).*
KR101955216_Machine_Translation (Year: 2019).*
JP2006183455_Machine_Translation (Year: 2006).*
JP2011045190_Description_Machine_Translation (Year: 2011).*
https://www.badellscollision.com/blog/quick-repair-plastic-bumper/ (Year: 2017).*
JP Office Action for Application No. 2021-133001, mailed Jul. 5, 2022.

* cited by examiner

Wide Tire — Vertical Guide

Vertical Guide — Narrow Tire

Wide Tire — V-Guide

V-Guide — Narrow Tire

WIRELESS CHARGING SYSTEM

CROSS-REFERENCE TO RELATED APPLICATIONS

This application claims priority under 35 U.S.C. § 119 to Korean Patent Application No. 10-2020-0103459, filed on Aug. 18, 2020, in the Korean Intellectual Property Office, the disclosure of which is incorporated herein by reference in its entirety.

TECHNICAL FIELD

The following disclosure relates to a wireless charging system for docking and wireless charging of a personal mobility driven by electrical energy. More particularly, the following disclosure relates to a wireless charging system capable of more efficiently performing wireless charging for various personal mobilities docked on wireless charging docks.

BACKGROUND

The contents described below provide only background information related to an embodiment according to the present invention and do not constitute the related art.

Recently, due to the development of industry and an increase in the number of automobiles, air pollution and traffic congestion in the center of the city are in a serious situation. In order to solve such a situation, the government and local governments have increased the supply of electric vehicles, have decreased the influx of automobiles into the center of the city, and have promoted public transportation. In addition, recently, various companies have supplied personal mobilities to induce persons to move to positions that public transportation may not reach or to move a short distance of 1 to 2 km, such that the demand for the personal mobilities has rapidly increased.

A representative personal mobility includes an electric bicycle, an electric kickboard, and the like, traveling by driving an electric motor on the basis of a battery. Among them, the electric kickboard has attracted attention as a short-distance transportation means due to its small size and low price.

Since the electric kickboard is driven by a battery, the battery should be charged before it is completely discharged. As a general method for charging the battery, a method of collecting all electric kickboards at night, charging batteries of the electric kickboards with a wired charger, and then relocating the electric kickboards early in the morning or a method of finding electric kickboards of which batteries are discharged and replacing the batteries with pre-charged batteries while carrying multiple pre-charged batteries in a case of battery-exchangeable electric kickboards has been used. Both of such methods have many disadvantages in terms of cost because they require a lot of manpower. In addition, the method of replacing the batteries has a disadvantage that an additional cost is generated in addition to labor costs because many spare batteries should be prepared.

Meanwhile, electric kickboards supporting a sharing service have become a social problem because users leave the electric kickboards anywhere when the users arrive at their destinations, thereby hindering traffic of vehicles or walking of pedestrians on sidewalks or adversely affecting city aesthetics. To solve such a problem, a method of determining places to put the electric kickboards in advance and allowing users to unconditionally put the electric kickboards at the determined places or manufacturing docks on which the electric kickboards are to be docked, disposing the docks at various places in the center of the city, and docking the electric kickboards on the docks is also used.

Recently, a technology of charging the battery of the electric kickboard while docking the electric kickboard on the dock by adding a charging function to the dock has been developed. As a dock charging method, a contact-type wired charging method of putting a plug into a socket is mainly used. If the batteries may be charged on the docks, works of collecting the electric kickboards, charging the batteries of the electric kickboards, and then relocating the electric kickboards do not need to be performed, and a considerable cost may thus be reduced, which helps to activate the sharing service. However, in such a dock contact-type wired charging method, when the user does not carefully dock the electric kickboard on the dock, the battery of the electric kickboard is not charged due to poor contact, such reliability is decreased, and when it rains or floods, there is a risk of an electric shock or a short circuit, such that safety is decreased.

In order to solve such a problem, a wireless charging-type dock wirelessly charging the battery of the electric kickboard on the dock has also been studied. When a wireless charging method is used, since there is no electrical or mechanical contact between the user and a charger, there is no risk of an electric shock or a short circuit, and the reliability of charging is guaranteed. In such a wireless charging-type dock, a feeding pad attached to the dock and a current collecting pad attached to the electric kickboard should be well aligned with each other, and an interval (gap) between the feeding pad and the current collecting pad should be constant in order to make efficient charging possible. However, since structures of handle frames and structures of wheels of the electric kickboards are slightly different from each other for each manufacturer, when the current collecting pad is attached to the feeding pad by a simple method, it is difficult to keep the gap constant. In addition, there is no means for making an angle of a handle of the electric kickboards constant, such that it is difficult to align the feeding pad and the current collecting pad with each other, and it is thus difficult to wirelessly charge various electric kickboards efficiently.

SUMMARY

An embodiment of the present invention is directed to providing a wireless charging system for a personal mobility capable of guaranteeing charging efficiency for the personal mobility by making it easy to align a feeding pad of a wireless charging dock and a current collecting pad of the personal mobility with each other, and keeping a gap between the feeding pad and the current collecting pad always constant, regardless of a design of the personal mobility docked on the wireless charging dock for charging.

In one general aspect, a wireless charging system for a personal mobility includes: a current collecting pad attached to the personal mobility; a feeding pad feeding power to the current collecting pad in a magnetic induction manner; and a wireless charging dock formed so that one or more personal mobilities are docked thereon and having one or more feeding pads disposed thereon to be implemented so that wireless charging is performed by the feeding pad and the current collecting pad facing each other when the one or more personal mobilities are docked on the wireless charging dock, wherein the wireless charging dock includes a wheel guide guiding a wheel of the personal mobility to enter a predetermined position for the purpose of alignment of the feeding pad and the current collecting pad in a horizontal direction when the personal mobility is docked on the wireless charging dock, and a bottom surface of the wheel guide is formed to be inclined in an advancing direction of the personal mobility so that the feeding pad and the current collecting pad are stuck to each other.

The wheel guide may be implemented in a Λ shape by including a first inclined surface and a second inclined surface formed in opposite directions.

The first inclined surface and the second inclined surface may be formed in a straight line shape, a curved line shape, or a bar shape.

The first inclined surface and the second inclined surface may be formed to have a predetermined length or more so that that the feeding pad and the current collecting pad are stuck to each other within a predetermined interval regardless of an angle of a handle frame of the personal mobility at the time of inserting the front wheel into the wheel guide.

The wheel guide may be implemented in a ⊔ shape.

The wheel guide may be implemented in a V shape.

The personal mobility may include a bumper preventing the feeding pad and the current collecting pad from colliding with each other and being damaged at the time of inserting the wheel into the wheel guide, and attached to the personal mobility so that a gap between the feeding pad and the current collecting pad is kept constant.

The bumper may have a different length depending on an angle of a handle frame of the personal mobility.

The wireless charging dock may include a holder holding the handle frame so that the personal mobility docked on the wireless charging dock does not fall.

The bumper and the holder may be implemented to be positioned at the same height when the personal mobility is docked on the wireless charging dock.

The current collecting pad may be attached onto the personal mobility so that heights of the current collecting pad and the feeding pad are the same as each other when the personal mobility is docked on the wireless charging dock.

The current collecting pad may receive at least one of status information and state of charge (SOC) information of a battery of the personal mobility, and information on the presence or absence of a failure of the personal mobility through communication with a battery management system (BMS) of the personal mobility.

The current collecting pad may measure a charging voltage and a charging current of a battery of the personal mobility and calculate an SOC of the battery from a charging characteristic curve of the battery.

The current collecting pad may transmit status information including an identification (ID), an SOC of a battery, and the presence or absence of a failure of the personal mobility through communication.

The feeding pad may include a display means displaying an SOC of a battery of the personal mobility docked on the wireless charging dock.

The wireless charging dock may include a direct current (DC) power supply supplying DC power to the one or more feeding pads, a controller reading and processing data from each feeding pad, and a modem transmitting the data of the controller to a remote server through a wired or wireless network.

The wireless charging dock may include a separate display means, and display an SOC of a battery of the personal mobility, various status information of the personal mobility, or status information of the wireless charging dock collected by the controller or display advertisement data transmitted to the remote server.

The wireless charging dock may share the DC power supply, the controller, and the model with an additional dock in a case where the additional dock needs to be installed in addition to one basic dock.

A gradient of the feeding pad may be adjusted so as to correspond to a gradient of the current collecting pad of the personal mobility docked on the wireless charging dock.

In another general aspect, a wireless charging providing method of the wireless charging system as described above includes: periodically outputting a pulse magnetic field from the feeding pad disposed on the wireless charging dock of the wireless charging system; recognizing whether or not the current collecting pad has approached a specific feeding pad; recognizing identification information of the current collecting pad that has approached the specific feeding pad; feeding, by the specific feeding pad, power to the current collecting pad; periodically transmitting, by the current collecting pad, SOC information of a battery to the specific feeding pad; transmitting, by the current collecting pad, a charging completion signal to the specific feeding pad when charging is completed; and stopping, by the specific feeding pad, feeding the power to the current collecting pad.

[Detailed Description of Main Elements]

Figure 1:
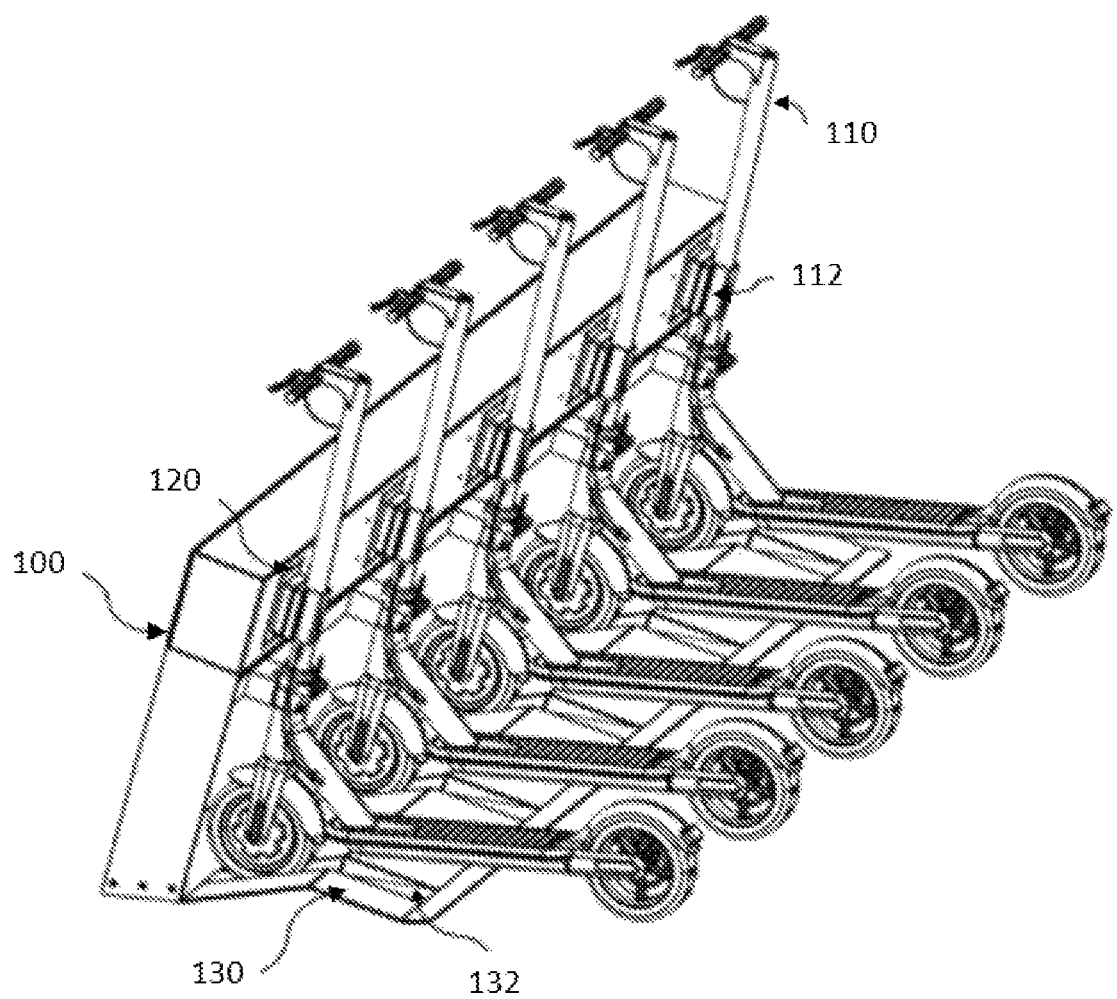
FIG. 1 is an overall configuration diagram of a wireless charging system for a personal mobility according to the present invention.

100: wireless charging system
110: personal mobility
112: current collecting pad
120: feeding pad
130: wireless charging dock -continued

[Detailed Description of Main Elements]

132: wheel guide
200: handle frame
410: bumper
420: holder
500: modem
510: power supply
520: controller

DETAILED DESCRIPTION OF EMBODIMENTS

Hereinafter, exemplary embodiments of the present invention will be described with reference to the accompanying drawings so that those skilled in the art may easily practice the present invention. It is to be noted that the same reference numbers as much as possible when denoting the same components or actions in other drawings are used as reference numbers denoting components or actions in the accompanying drawings. In addition, in describing the present invention, when it is determined that a detailed description for a related known configuration or function may unnecessarily obscure the gist of the present invention, the detailed description will be omitted.

FIG. 1 is an overall configuration diagram of a wireless charging system for a personal mobility according to the present invention. The wireless charging system 100 performs docking and wireless charging of a personal mobility 110.

Referring to FIG. 1, the wireless charging system 100 according to the present invention charges a battery of a personal mobility 110 by attaching a feeding pad 120 to a wireless charging dock 130 and attaching a current collecting pad 112 to the personal mobility 110 to transfer power from the feeding pad 120 to the current collecting pad 112 by magnetic induction when the personal mobility is docked on the wireless charging dock 130.

The current collecting pad 112 is configured to include a current collecting core, a current collecting coil wound around the current collecting core, a resonance circuit, a rectifier, and a current collecting controller, and may further include particularly, a regulator and the like.

Such a current collecting pad 120 is preferably attached to a front surface of the personal mobility 110, but is not necessarily limited thereto.

In more detail, the current collecting pad 112 should be attached onto the personal mobility 110 so that heights of the current collecting pad 112 and the feeding pad are constant when the personal mobility 110 is docked on the wireless charging dock 130.

That is, the current collecting pad 112 may be attached to the personal mobility 110 so as to be positioned at a height that is the same as or similar to that of the feeding pad 120 when the personal mobility 110 is docked on the wireless charging dock 130. In this case, an allowable range for an alignment error between the current collecting pad and the feeding pad in a vertical direction may be determined not to exceed a preset threshold value.

For example, the preset threshold value may be determined according to a wireless charging efficiency value grasped in advance in relation to the alignment error in the vertical direction.

The current collecting pad 112 may collect various information related to the personal mobility 110 to which the current collecting pad 112 is attached through a current collecting controller (not illustrated). For example, the current collecting pad 112 may collect information such as status information and state of charge (SOC) information of the battery of the personal mobility 110, and information on the presence or absence of a failure of the personal mobility. To this end, the current collection controller may include a wired or wireless communication means for communication with a battery management system (BMS) or a mobility driving controller.

Meanwhile, the current collection controller may measure a charging voltage and a charging current of the battery and calculate the SOC itself of the battery from a charging characteristic curve of the battery, instead of receiving SOC information of the battery from the battery management system of the personal mobility 110.

The current collecting pad 112 may transmit information collected in relation to the personal mobility 110 to a corresponding feeding pad on the wireless charging dock 130 on which the personal mobility 110 is docked through communication. In this case, a communication method may be wireless communication, such as wireless fidelity (Wifi) or Zigbee or may be in-band magnetic field communication. For the purpose of the in-band magnetic field communication, the rectifier in the current collector pad is not a simple diode rectifier, but may be in an inverter form in which active elements such as metal oxide semiconductor field effect transistors (MOSFETs) or insulated gate bipolar transistors (IGBTs) are combined with each diode in a reverse direction. This is because an inverter should transmit a signal through the current collector coil.

The feeding pad 120 serves to feed power to the current collecting pad 112 in a magnetic induction manner.

Such a feeding pad 120 may be preferably installed on the wireless charging dock 130. In more detail, one or more feeding pads 120 may be installed in a vertical direction in which the personal mobility 110 is docked, in an upper region of the wireless charging dock 130.

According to such an installation structure of the feeding pad 120, when the personal mobility 110 is docked on the wireless charging dock 130, the feeding pad 120 and the current collecting pad 112 face each other, such that wireless charging may be performed.

The feeding pad 120 may be configured to include a feeding inverter providing high-frequency power for wireless charging, a resonance circuit, a feeding core, a feeding coil wound around the feeding core, and a feeding controller.

The feeding pad 120 may receive status information of the personal mobility 110 to which the current collecting pad 112 is attached through communication with the current collecting pad 112, and display the status information through a separate display means (e.g., a display of FIGS. 3A, 3B, and 8) implemented in the wireless charging dock 130. In addition, the feeding pad may measure a state of charge (SOC) charged in the personal mobility and transmit a charge rate information to a control board.

The wireless charging dock 130 has a docking structure that allows the personal mobility 110 docked on the wireless charging dock to be wirelessly charged more efficiently. The wireless charging dock 130 includes a wheel guide 132 formed to be able to dock the personal mobility 110.

Hereinafter, a docking structure of the wireless charging dock 130 according to the present invention will be described with reference to FIGS. 2 to 6 together.

As mentioned above, the wireless charging dock 130 includes the wheel guide 132 formed to be able to dock the personal mobility 110. For example, a user of the wireless charging dock 130 may dock the personal mobility 110 on the wireless charging dock 130 by inserting and entering a front wheel of the personal mobility 110 into the wheel guide 132.

The wheel guide 132 serves to guide the front wheel of the personal mobility 110 to enter a predetermined position for the purpose of alignment of the feeding pad 120 on the wireless charging dock 130 and the current collecting pad 112 on the personal mobility 110 in a horizontal direction when the personal mobility 110 is docked on the wireless charging dock 130. In addition, the wheel guide 132 serves to hold the front wheel so that a handle is not arbitrarily turned.

In this case, the predetermined position is a position corresponding to each feeding pad 120 disposed on the wireless charging dock 130, and with such a wheel guide 132, the current collecting pad 112 and the feeding pad 120 are uniformly aligned with each other at the time of docking the personal mobility 110, such that wireless charging may be performed. The wheel guide should be configured to be slightly wider than a width of the wheel of the personal mobility and have a minimum width so that the handle is not turned too much leftward and rightward. The width of the wheel guide is preferably about 1.1 to 1.5 times the width of the wheel.

Meanwhile, in order to improve power transmission efficiency in a wireless charging process, a distance between the current collecting pad and the feeding pad should be kept constant. However, even though the wheel guide exists, there is inevitably a difference in a docking form depending on a design of the personal mobility docked on the wireless charging dock, which causes a problem that wireless charging efficiency differently appears for each personal mobility.

In order to solve such a problem, in the wireless charging dock 130 according to the present invention, a bottom surface of the wheel guide 132 is formed to be inclined in an advancing direction in order to keep a gap between the feeding pad 120 and the current collecting pad 112 constant.

Figure 2:
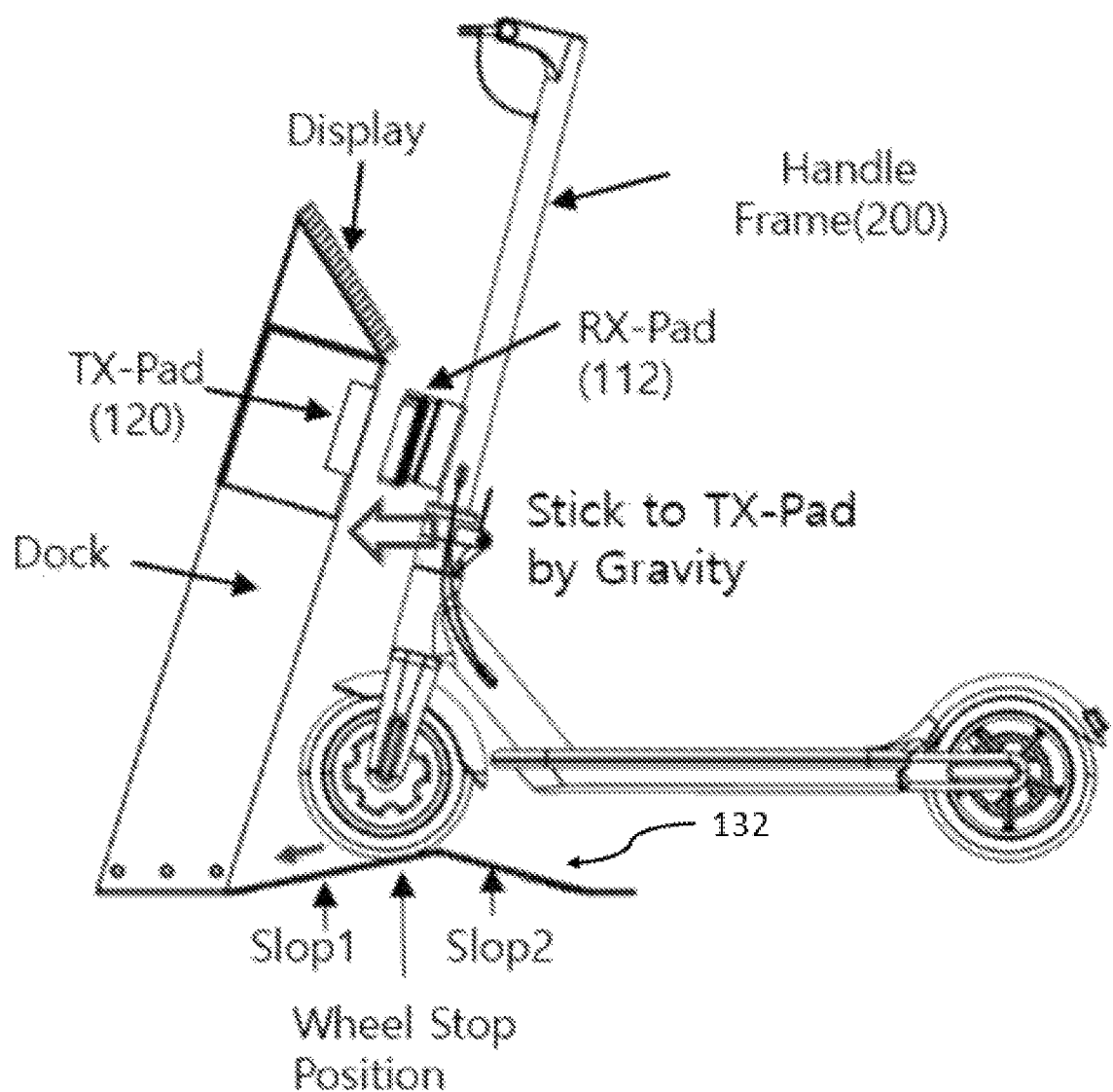
FIG. 2 is a view for describing a shape of a wheel guide for keeping a gap between a feeding pad and a current collecting pad constant according to the present invention.

For example, referring to FIG. 2, the wheel guide 132 is implemented in a Λ shape (inverted V shape) by including a first inclined surface Slop1 and a second inclined surface Slop2 formed in opposite directions when the personal mobility 110 is viewed from the side.

That is, when the user allows the front wheel of the personal mobility 110 to enter the first inclined surface of the wheel guide 132 along the second inclined surface of the wheel guide 132, the front wheel moves in the advancing direction while rolling along the first inclined surface by gravity, such that the current collecting pad 112 and the feeding pad 120 may be stuck to each other. This plays an important role in maximizing the wireless charging efficiency.

Furthermore, the first inclined surface and the second inclined surface may be implemented to have a predetermined length or more so that that the feeding pad 120 and the current collecting pad 112 may be stuck to each other within a predetermined interval regardless of an angle of a handle frame of the personal mobility 110 at the time of inserting the front wheel into the wheel guide 132. In this case, the predetermined length may be determined according to the angle of the handle frame of the personal mobility that may be docked on the wireless charging dock.

Figure 3A:
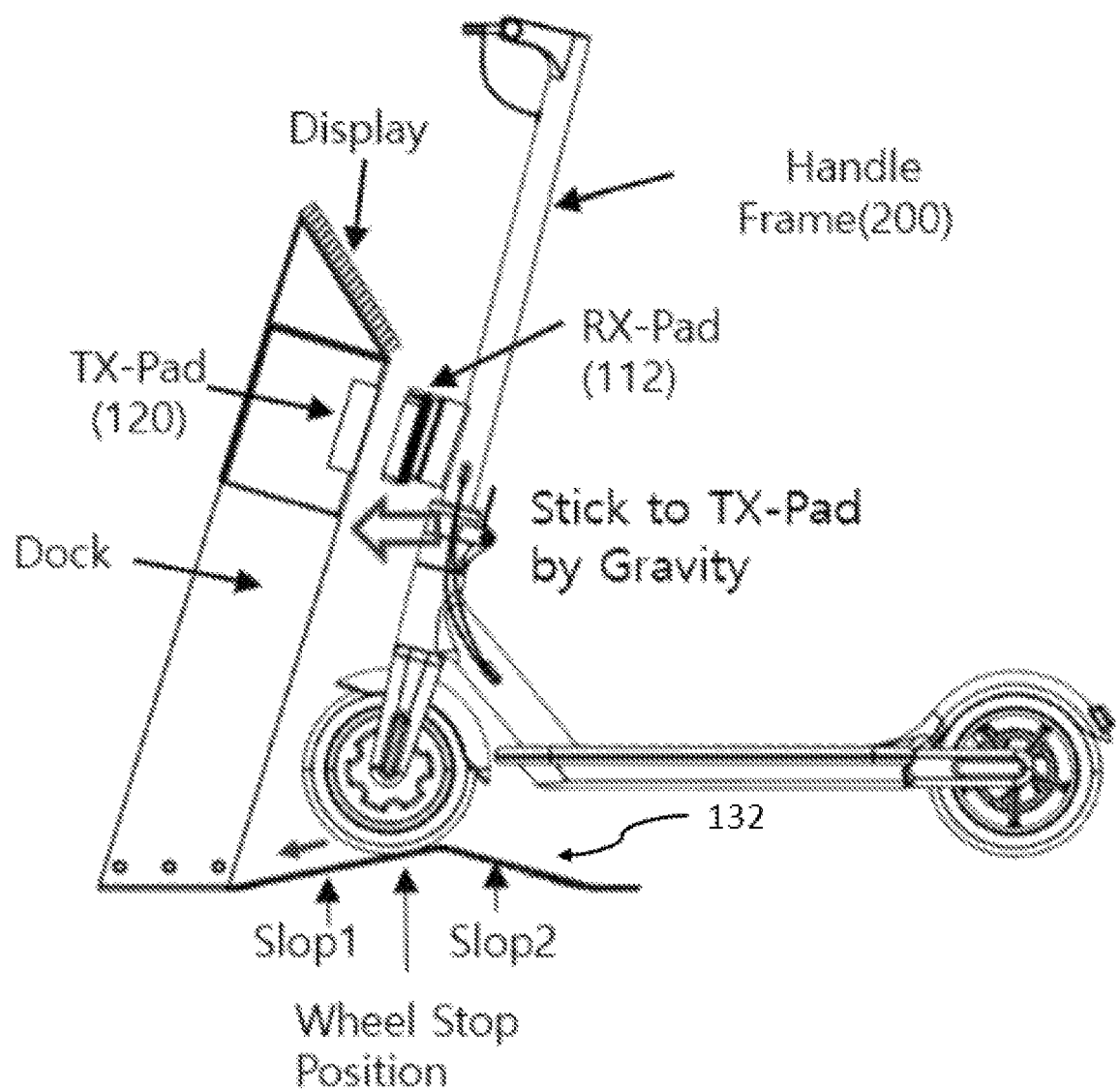
FIGS. 3A and 3B are structural exemplary views in which a gap between a feeding pad and a current collecting pad is kept constant even in a case of two personal mobilities of which angles of handle frames are different from each other according to the present invention.
Figure 3B:
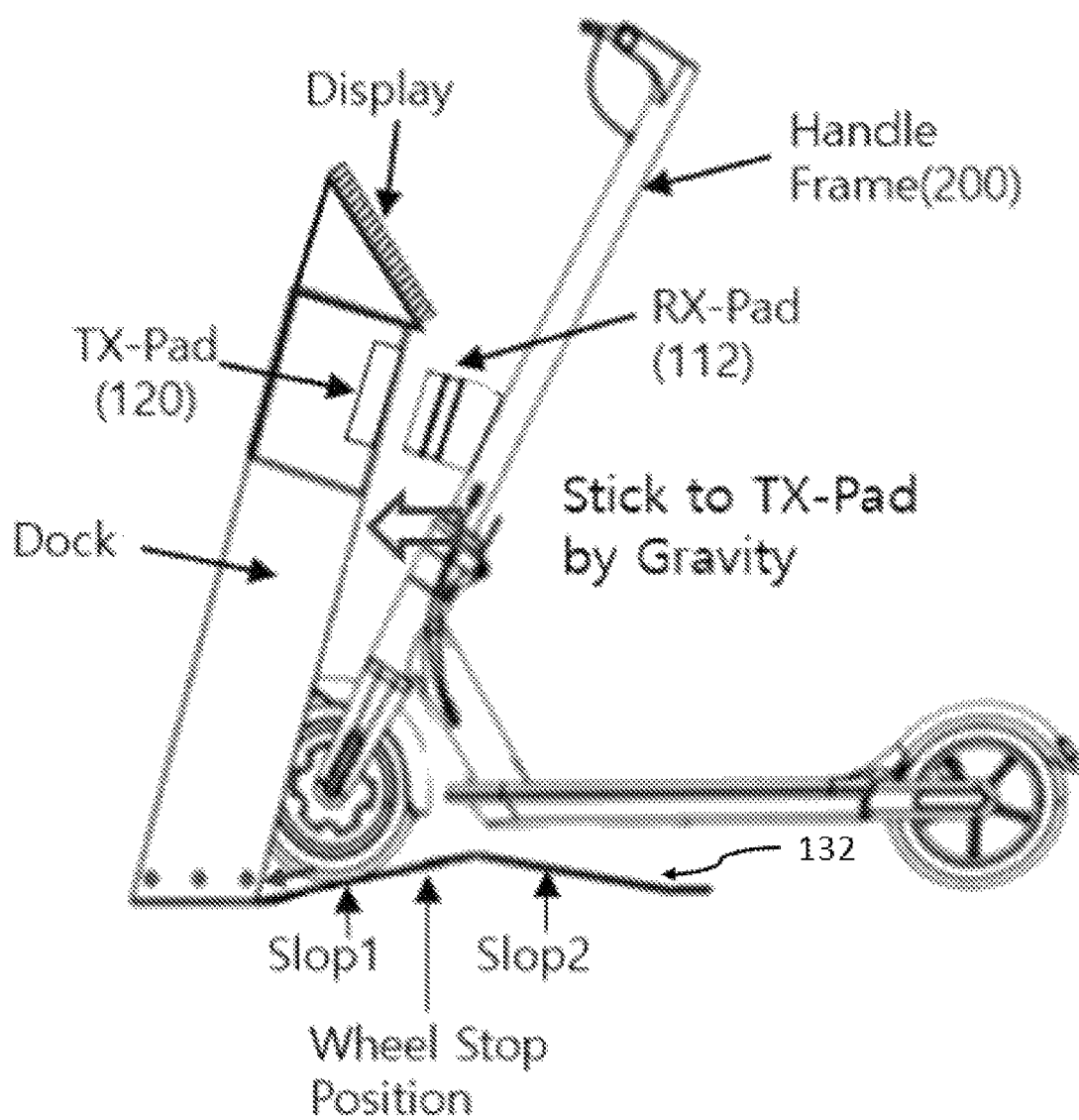

For example, referring to FIGS. 3A and 3B, it may be formed that in the wheel guide 132 according to the present invention, sufficient inclined surfaces are formed so that the front wheel may be stopped on a point at which a distance between the feeding pad and the current collecting pad becomes a preset threshold distance with respect to both of personal mobilities of which angles of handle frames 200 are different from each other.

Figure 4A:
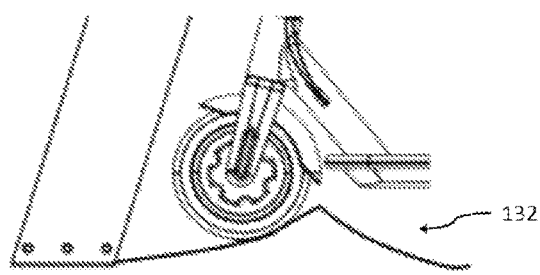
FIGS. 4A and 4B are views illustrating an example of another inclined surface of the wheel guide in the wireless charging system according to the present invention.
Figure 4B:
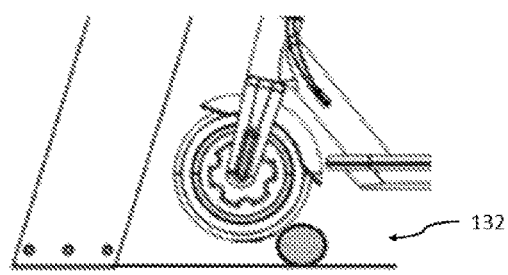

In addition, as illustrated in FIGS. 4A and 4B, each of the first inclined surface and the second inclined surface of the wheel guide 132 may be formed as a curved line, and a bar having a circular cross section may be simply put and serve as the first inclined surface and the second inclined surface.

Figure 5A:
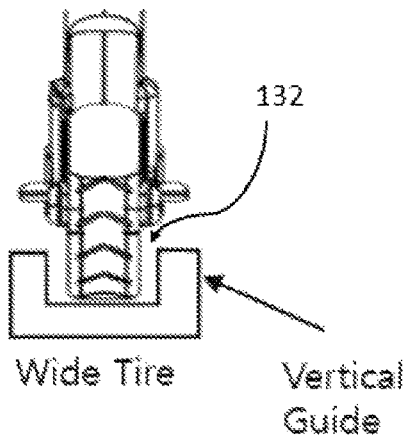
FIGS. 5A to 5D are views for describing a shape of the wheel guide for minimizing an alignment error between the feeding pad and the current collecting pad in the wireless charging system according to the present invention.
Figure 5B:
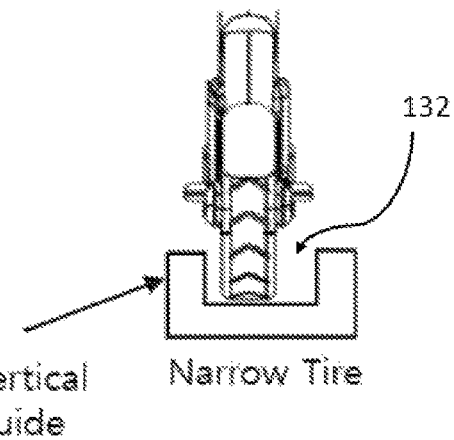

Referring to FIGS. 5A to 5D, the wheel guide 132 may be implemented in a ⌴ shape as illustrated in FIGS. 5A and 5B when the personal mobility 110 docked on the wireless charging dock 130 is viewed from the front. In more detail, the wheel guide 132 may be formed in a shape in which the bottom surface of the wheel guide 132 is inclined in the advancing direction, and may be implemented in a structure in which a guide wall is formed in a ⌴ shape. In a case where a deviation between widths of wheels of personal mobilities circulated on the market is large, if the guide wall having the ⌴ shape is configured in accordance with a wheel having the largest width, a wheel having a small width may be pushed leftward and rightward or the handle may be turned leftward and rightward, as illustrated in FIG. 5B, such that an alignment error in the horizontal direction may increase. Therefore, the width of the wheel guide 132 having the ⌴ shape is preferably about 1.1 to 1.15 times the width of the front wheel width of the personal mobility 110 of which a width of the front wheel is the smallest.

Figure 5C:
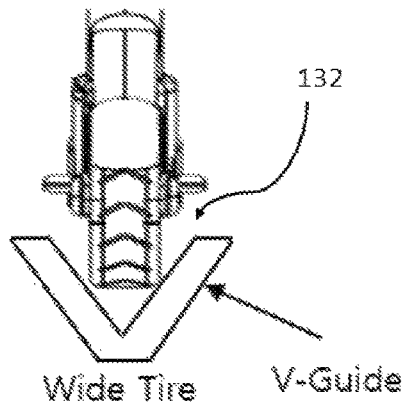
Figure 5D:
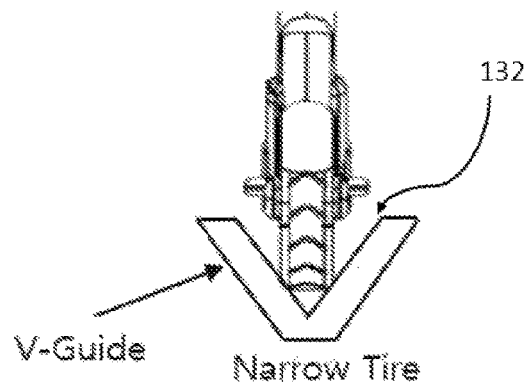

In another embodiment of the present invention, the wheel guide may be implemented as a wheel guide having a V shape as illustrated in FIGS. 5C and 5D.

In more detail, the wheel guide 132 having the V shape may be formed in a shape in which a bottom surface thereof is inclined in the advancing direction, and may be implemented in a structure in which a guide wall is formed in a V shape when the personal mobility 110 docked on the wireless charging dock 130 is viewed from the front.

In such a structure of the wheel guide 132 having the V shape, since the front wheel of the personal mobility 110 is not pushed leftward and rightward or the handle is not turned leftward and rightward regardless of a thickness of the front wheel, as illustrated in FIGS. 5C and 5D when the front wheel of the personal mobility 110 is docked in the wheel guide 132, an alignment error between the feeding pad 120 and the current collecting pad in the horizontal direction may be minimized.

Furthermore, in the present embodiment, the feeding pad 120 on the wireless charging dock 130 may be implemented in a structure in which a gradient thereof is adjusted so as to correspond to a gradient of the current collecting pad 112 of the personal mobility 110 docked on the wireless charging dock 130 in order to be aligned with the current collecting pad 112. That is, angles of the feeding pad 120 and the current collecting pad 112 do not match each other according to a type of the personal mobility 110 or an inclination of the ground on which the wireless charging dock 130 is installed, such that the feeding pad 120 and the current collecting pad 112 may not be in close contact with each other.

In order to solve such a problem, a fixing portion of the feeding pad 120 may have a configuration in which an angle of the feeding pad 120 is freely adjusted. Through this, when the current collecting pad 112 having a specific angle enters, the angle of the feeding pad 120 is automatically adjusted so as to match the angle of the current collecting pad 112, such that the feeding pad 120 and the current collecting pad 112 are in close contact with each other, and the personal mobility may thus be always charged at the highest efficiency.

Figure 6:
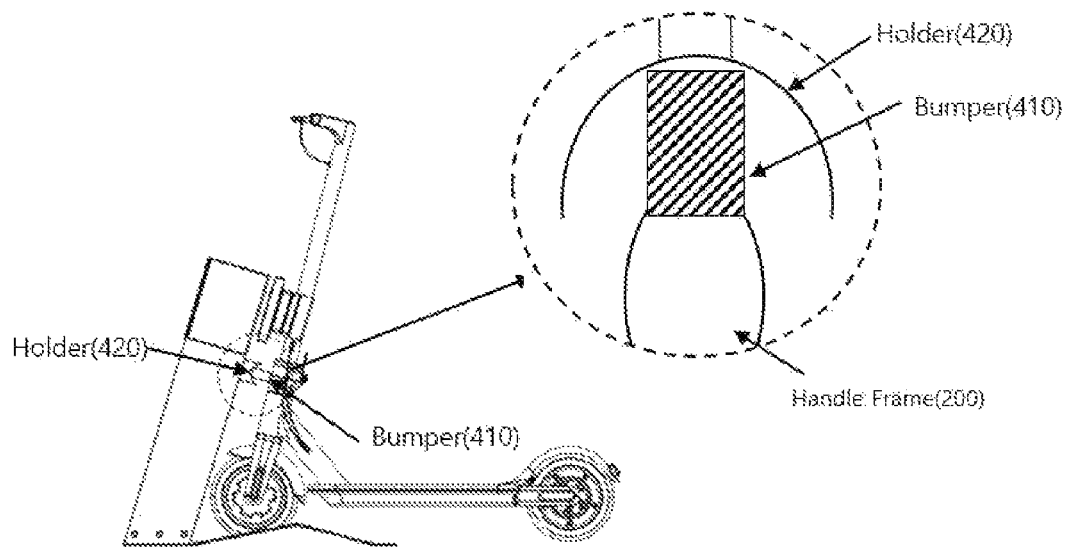
FIG. 6 is a configuration diagram of a bumper and a handle frame holder of the wireless charging system according to the present invention.

FIG. 6 is a configuration diagram of a bumper and a holder in the wireless charging system according to the present invention.

Referring to FIG. 6, the wireless charging system according to the present invention may be configured to further include a bumper 410 attached to the personal mobility 110 and a holder 420 provided on the wireless charging dock 130.

The bumper 410 serves to prevent the feeding pad 120 and the current collecting pad 112 from colliding with each other and being damaged at the time of inserting the front wheel into the wheel guide 132.

In more detail, the bumper 410 is implemented in a form in which it protrudes toward the wireless charging dock 130 on the front surface of the personal mobility 110 by a predetermined length. Therefore, the front wheel of the personal mobility 110 entering the wheel guide 132 by rolling along the inclined surface of the wheel guide 132 operates to be stopped so that the feeding pad 120 and the current collecting pad 112 has a predetermined interval therebetween before coming into contact and collide with each other.

The bumper 410 has an effect of keeping the gap between the feeding pad 120 and the current collecting pad 112 constant. To this end, a length of the bumper 410 is preferably an interval enough to minimize the interval between the feeding pad 120 and the current collecting pad 112, but for the feeding pad 120 and the current collecting pad 112 not to collide with each other.

In the present invention, a length of the bumper 410 may be determined to be different depending on the angle of the handle frame of the personal mobility. For example, a bumper of a personal mobility of which an angle of a handle frame is large may be implemented to have a length larger than that of a bumper of a personal mobility of which an angle of a handle frame is small. Therefore, the gap between the feeding pad 120 and the current collecting pad 112 may be kept constant regardless of the design of the personal mobility 110. Meanwhile, the handle frame may be manufactured to have a different angle depending on the design or a passenger, and a magnitude criterion for the angle of the handle frame may be determined in advance. For example, whether the angle of the handle frame is large or small may be determined on the basis of an average angle of the handle frames of personal mobilities sold on the market.

The holder 420 is provided on the wireless charging dock 130, and serves to hold the handle frame 200 so that the personal mobility 110 docked on the wireless charging dock 130 does not fall leftward or rightward.

The handle frame 200 of the personal mobility 110 may be fastened to the holder 420, and in a case where the bumper 410 is provided, the bumper 410 may be fastened to the holder 420.

Referring to FIG. 6, the holder 420 may be implemented so that the gap between the feeding pad 120 and the current collecting pad 112 is kept constant in a state in which the handle frame 200 or the bumper 410 is fastened to the holder 420.

To this end, the bumper 410 and the holder 420 may be implemented to be positioned at the same height when the personal mobility 110 is docked on the wireless charging dock 130.

In addition, the holder 420 may be implemented in a structure in which it surrounds the bumper 410 of the personal mobility 110 so as to be easily fastened to the bumper 410 on the personal mobility 110. More preferably, the holder 420 may be formed of an elastic member. For example, the holder 420 may be coupled to the bumper 410 in a manner in which it spreads by elasticity in a case where the bumper 410 of the personal mobility 110 comes into contact with the holder 420 and then shrinks again to surround the bumper 410.

Figure 7:
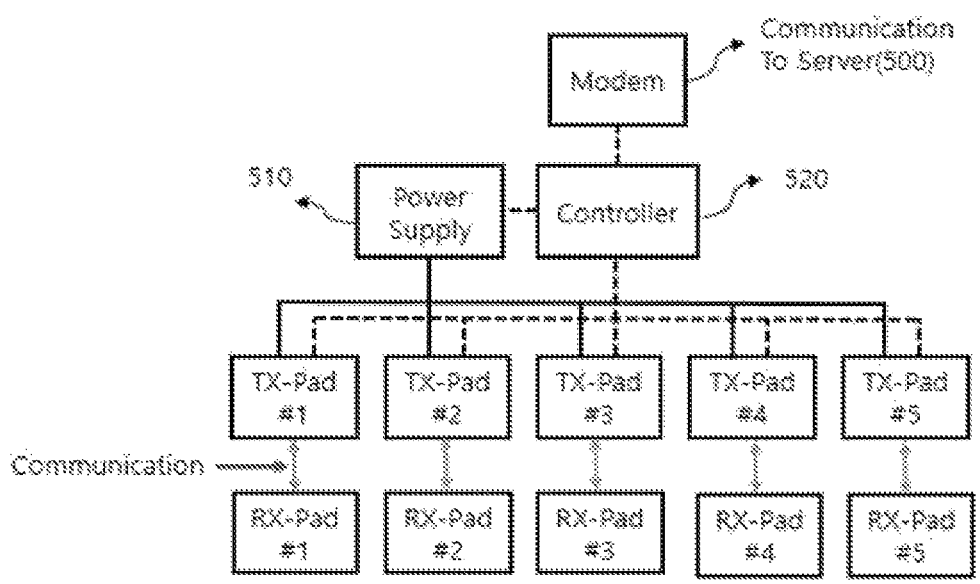
FIG. 7 is a block diagram illustrating a functional configuration of an internal module of the wireless charging system according to the present invention.

FIG. 7 is a block diagram illustrating a configuration of internal modules of the wireless charging system according to the present invention.

As illustrated in FIG. 7, a direct current (DC) power supply 510, a controller 520, a modem 500, one or more feeding pads, a display, and the like, may be provided as internal modules of the wireless charging dock 130 according to the present invention. Such internal modules may be preferably implemented on the wireless charging dock 130.

The DC power supply 510 supplies required DC power to one or more feeding pads. The DC power supply serves to receive alternating current (AC) power, and rectifies and regulates the AC power to produce predetermined DC power. A circuit breaker may be included at an input terminal of the DC power supply.

The controller 520 serves to control the driving of the feeding pad 120, the modem 500, and the power supply 510.

The controller 520 reads and processes data received by each feeding pad from the current collecting pads of the personal mobilities, and transmits some or all of the data to the modem. Information received from the current collecting pads through the feeding pads may be status information such as identifications (IDs), SOCs of the batteries, and the presence or absence of failures of the personal mobilities.

The controller 520 may display the received data through a separate display means provided on the wireless charging dock 130.

For example, referring to FIG. 7, the controller 520 may confirm SOC information of the batteries received by each feeding pad from the current collecting pads of the personal mobilities, and display the SOC information on the display means corresponding to each feeding pad. The display means may be a light emitting diode (LED), and in this case, the SOC information of the batteries may be displayed in a manner in which LEDs corresponding to SOC levels are turned on step by step.

Figure 8:
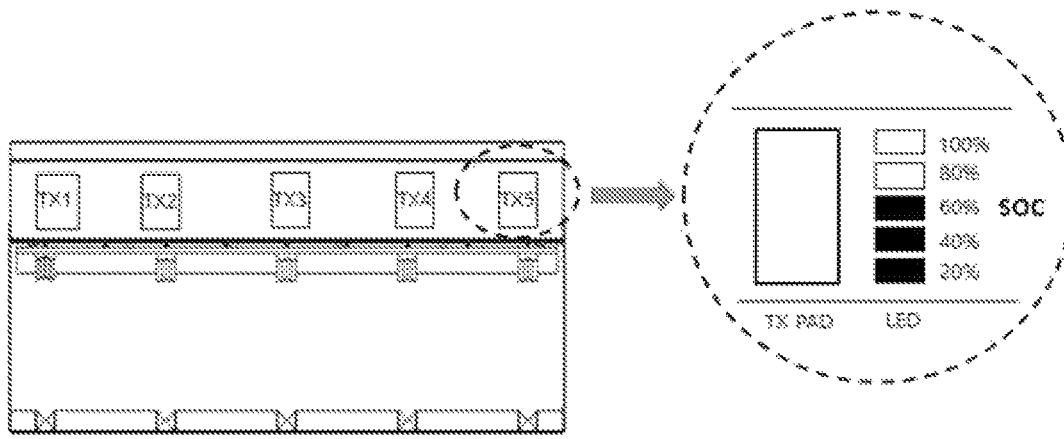
FIG. 8 is a view illustrating a method of displaying battery state of charge (SOC) information of a personal mobility docked around the feeding pad of the wireless charging system according to the present invention.

Separately, the feeding pad may display SOC information received from the current collecting pad by itself as illustrated in FIG. 8.

The controller 520 may receive advertisement data or the like transmitted from a remote server, and provide the advertisement data to the user through the display means. Meanwhile, the user may view the advertisement material and transfer feedback for the advertisement data to the remote server, and in this case, the remote server may additionally provide benefit information such as charging fee discount or the like to the user.

The modem 500 may be a two-way modem that receives information from the controller 520 and transmits the information to the remote server in a wired or wireless manner or receives data from the remote server and transmits the data to the controller 520.

Figure 9:
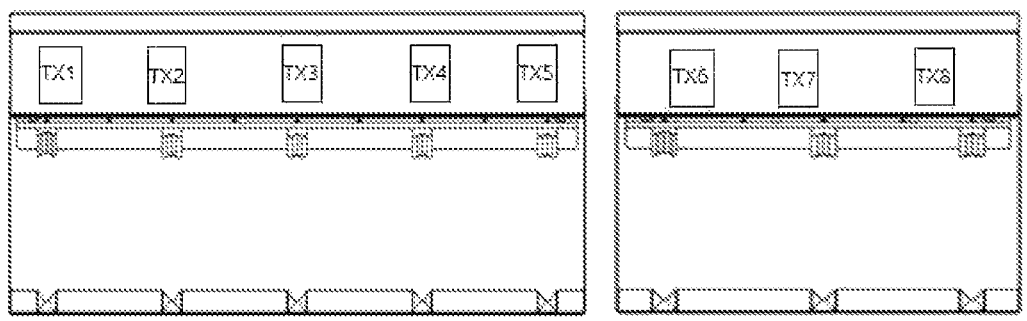
FIG. 9 is a view illustrating scalability of the wireless charging system according to the present invention.
Figure 9:
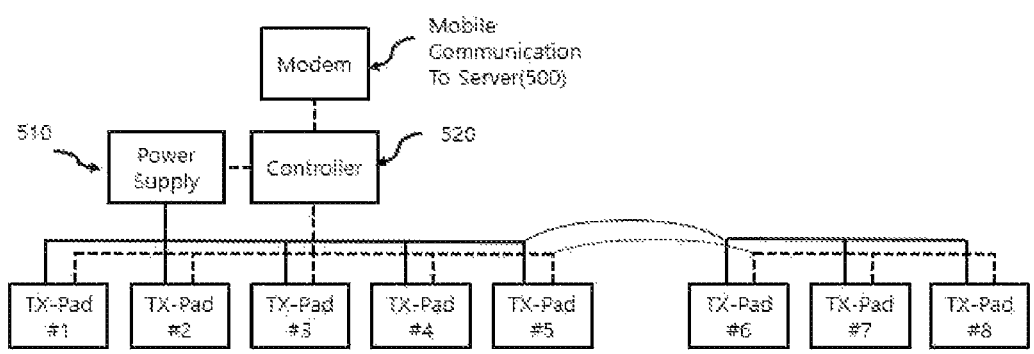

FIG. 9 is a view for describing a method of expanding the wireless charging system according to the present invention.

Referring to FIG. 9, in the wireless charging system according to the present invention, the wireless charging dock has an extended structure that may be coupled to another wireless charging dock, such that the number of personal mobilities docked on the wireless charging dock may be increased.

In this case, the wireless charging dock is implemented to be able to share the modem 500, the power supply 510, and the controller 520 provided in the wireless charging dock with another wireless charging dock coupled to the wireless charging dock thereby providing two wireless charging devices, such that two wireless charging docks may be operated as one wireless charging dock.

In another embodiment, the respective wireless charging docks may be driven by the modem 500, the power supply 510 and the controller 520 provided in each of the wireless charging docks, and may be operated to share information with each other.

With the wireless charging system according to the present invention, it is possible to provide wireless charging according to the following sequence.

First, one or more feeding pads 120 disposed on the wireless charging dock 130 periodically output a short pulse magnetic field.

Such a pulse magnetic field may be utilized as a means for recognizing whether or not the personal mobility 110, which is a target to be charged, has approached the wireless charging dock 130, more specifically, for recognizing whether or not the current collecting pad attached to the personal mobility 110 has approached the wireless charging dock 130.

The wireless charging dock 130 recognizes whether or not the current collecting pad has approached a specific feeding pad through the output of the pulse magnetic field.

The wireless charging dock 130 recognizes identification information of the current collecting pad that has approached the specific feeding pad. For example, the specific feeding pad may receive the identification information through magnetic field communication with the current collecting pad that has approached the specific feeding pad.

The wireless charging dock 130 controls the specific feeding pad to feed power to the current collecting pad. For example, the wireless charging dock 130 operates so that the specific feeding pad may feed the power to the current collecting pad by controlling a current supplied to the specific feeding pad.

In this case, an amount, a feeding time, and the like, of current fed to the specific feeding pad may be adjusted based on charging information calculated on the basis of the previously recognized identification information of the current collecting pad.

The current collecting pad periodically transmits SOC information of the battery to the specific feeding pad. The specific feeding pad may confirm a charging status on the basis of the SOC information of the battery transmitted from the current collecting pad, and may output the confirmed charging status through the display means.

The current collecting pad transmits a charging completion signal to the specific feeding pad when the charging is completed, and the wireless charging dock 130 controls the specific feeding pad to stop feeding the power to the current collecting pad when the wireless charging dock 130 recognizes the reception of the charging completion signal.

With the wireless charging system for a personal mobility according to the present invention, charging efficiency for the personal mobility may be guaranteed and safety may be guaranteed, by allowing the feeding pad of the wireless charging dock and the current collecting pad of the personal mobility to be always constantly aligned with each other and keeping the gap between the feeding pad and the current collecting pad always constant at the time of docking the personal mobility on the wireless charging dock regardless of a design of the personal mobility docked on the wireless charging dock for charging.

The spirit of the present embodiments has been merely illustratively described hereinabove, and those skilled in the art to which the present embodiments pertain may make various modifications and alterations without departing from the essential characteristics of the present embodiments. Accordingly, the present embodiments are to describe the spirit of the present embodiments rather than to limit the spirit of the present embodiments. The scope of the present embodiments is not limited to these embodiments. The scope of the present embodiments should be interpreted by the following claims, and it should be interpreted that all the spirits equivalent to the following claims fall within the scope of the present embodiments.

What is claimed is:

1. A wireless charging system for a personal mobility, comprising:
a current collecting pad attached to the personal mobility;
a feeding pad feeding power to the current collecting pad in a magnetic induction manner; and
a wireless charging dock formed so that one or more personal mobilities are docked thereon and having one or more feeding pads disposed thereon to be implemented so that wireless charging is performed by the feeding pad and the current collecting pad facing each other when the one or more personal mobilities are docked on the wireless charging dock,
wherein the wireless charging dock includes a wheel guide guiding a wheel of the personal mobility to enter a predetermined position for a purpose of alignment of the feeding pad and the current collecting pad in a horizontal direction when the personal mobility is docked on the wireless charging dock, a holder holding a handle frame of the personal mobility so that the personal mobility docked on the wireless charging dock does not fall and being implemented so that a gap between the feeding pad and the current collecting pad is kept constant in a state in which the handle frame is fastened to the holder, and a bottom surface of the wheel guide is formed to be inclined in an advancing direction of the personal mobility so that the feeding pad and the current collecting pad are close to each other.

2. The wireless charging system of claim 1, wherein the wheel guide is implemented in a shape such that there are two separated substantially congruent sides facing each other vertically and in parallel and attached at their downward ends by a third side.

3. The wireless charging system of claim 1, wherein the wheel guide is implemented in a V-shape.

4. The wireless charging system of claim 1, wherein the current collecting pad is attached onto the personal mobility so that heights of the current collecting pad and the feeding pad are the same as each other when the personal mobility is docked on the wireless charging dock.

5. The wireless charging system of claim 1, wherein the current collecting pad receives at least one of status information or state of charge (SOC) information of a battery of the personal mobility, or information on the presence or absence of a failure of the personal mobility through communication with a battery management system (BMS) of the personal mobility.

6. The wireless charging system of claim 1, wherein the current collecting pad measures a charging voltage and a charging current of a battery of the personal mobility and calculates an SOC of the battery from a charging characteristic curve of the battery.

7. The wireless charging system of claim 1, wherein the current collecting pad transmits status information including an identification (ID), an SOC of a battery, and the presence or absence of a failure of the personal mobility through communication.

8. The wireless charging system of claim 1, wherein the feeding pad includes a display means displaying an SOC of a battery of the personal mobility docked on the wireless charging dock.

9. The wireless charging system of claim 1, wherein a gradient of the feeding pad is adjusted so as to correspond to a gradient of the current collecting pad of the personal mobility docked on the wireless charging dock.

10. A wireless charging providing method of the wireless charging system of claim 1, comprising:
periodically outputting a pulse magnetic field from the feeding pad disposed on the wireless charging dock of the wireless charging system;
recognizing whether or not the current collecting pad has approached a specific feeding pad;
recognizing identification information of the current collecting pad that has approached the specific feeding pad;
feeding, by the specific feeding pad, power to the current collecting pad;
periodically transmitting, by the current collecting pad, SOC information of a battery to the specific feeding pad;
transmitting, by the current collecting pad, a charging completion signal to the specific feeding pad when charging is completed; and
stopping, by the specific feeding pad, feeding the power to the current collecting pad.

11. The wireless charging system of claim 1, wherein the wheel guide comprises a first inclined surface and a second inclined surface formed in opposite directions.

12. The wireless charging system of claim 11, wherein the first inclined surface and the second inclined surface are formed in a straight line shape, a curved line shape, or a bar shape.

13. The wireless charging system of claim 11, wherein the first inclined surface and the second inclined surface are formed to have a predetermined length or more so that that the feeding pad and the current collecting pad are close to each other within a predetermined interval regardless of an angle of a handle frame of the personal mobility at the time of inserting the front wheel into the wheel guide.

14. The wireless charging system of claim 1, wherein the personal mobility includes a bumper preventing the feeding pad and the current collecting pad from colliding with each other and being damaged at the time of inserting the wheel into the wheel guide, and attached to the personal mobility so that the gap between the feeding pad and the current collecting pad is kept constant.

15. The wireless charging system of claim 14, wherein the bumper has a length corresponding to an angle of the handle frame of the personal mobility.

16. The wireless charging system of claim 14, wherein the bumper and the holder are implemented to be positioned at the same height when the personal mobility is docked on the wireless charging dock.

17. The wireless charging system of claim 1, wherein the wireless charging dock includes a direct current (DC) power supply supplying DC power to the one or more feeding pads, a controller reading and processing data from each feeding pad, and a modem transmitting the data of the controller to a remote server through a wired or wireless network.

18. The wireless charging system of claim 17, wherein the wireless charging dock includes a separate display means, and displays an SOC of a battery of the personal mobility, various status information of the personal mobility, or status information of the wireless charging dock collected by the controller or displays advertisement data transmitted to the remote server.

19. The wireless charging system of claim 17, wherein the wireless charging dock shares the DC power supply, the controller, and the modem with an additional dock in a case where the additional dock needs to be installed in addition to one basic dock.

* * * * *